United States Patent [19]
Arao

[11] 3,955,365
[45] May 11, 1976

[54] FLUID COUPLED DRIVE APPARATUS

[75] Inventor: Masachika Arao, Chatsworth, Calif.

[73] Assignee: The Garrett Corporation, Los Angeles, Calif.

[22] Filed: Apr. 28, 1975

[21] Appl. No.: 572,677

Related U.S. Application Data

[63] Continuation of Ser. No. 428,487, Dec. 26, 1973, abandoned.

[52] U.S. Cl. .................... 60/330; 60/358; 74/730
[51] Int. Cl.² .......................... F16D 33/06
[58] Field of Search ............ 60/330, 347, 357, 358, 60/435; 74/730, 731, 732, 856

[56] References Cited
UNITED STATES PATENTS

| | | | |
|---|---|---|---|
| 2,377,851 | 6/1945 | Blank | 60/358 |
| 2,392,300 | 1/1946 | Ziebolz et al. | 60/358 |
| 3,043,162 | 7/1962 | Kugel et al. | 74/732 |
| 3,394,618 | 7/1968 | Dhonau | 60/358 |
| 3,483,852 | 12/1969 | Newman et al. | 60/358 X |

FOREIGN PATENTS OR APPLICATIONS

| | | | |
|---|---|---|---|
| 497,779 | 12/1938 | United Kingdom | 60/330 |
| 1,500,434 | 6/1969 | Germany | 60/358 |

*Primary Examiner*—Edgar W. Geoghegan
*Attorney, Agent, or Firm*—Albert J. Miller; Alfons Valukonis

[57] ABSTRACT

Drive apparatus providing input gearing with an input shaft adapted to be connected to a single-shaft gas turbine, output gearing with an output shaft for connection to a load, a fluid coupling interconnecting the input and output gearing, and fluid supply apparatus for directing metered fluid to the fluid coupling to control the amount of coupling, which provides for the speed of the output shaft to be varied, thus enabling the powering of loads characteristically having high starting and uneven running torques, such as positive displacement pumps and compressors.

5 Claims, 3 Drawing Figures

FLUID COUPLED DRIVE APPARATUS

This is a continuation of application Ser. No. 428,487 filed Dec. 26, 1973, now abandoned.

BACKGROUND OF THE INVENTION

A limitation of any turbine of a single-shaft construction, i.e., where a separate free power turbine is not provided, is that the turbine and load must be started as a unit. In many instances such turbines are utilized solely for driving generators and cannot be used for powering loads of high-starting inertia or those of pulsating operation. Typically, such loads are positive displacement compressors, pumps, and vehicles. Compounding the problem in many instances, the driven load cannot be adjusted to provide the low drag necessary for the turbine to attain operating speed without an abnormally large starting power source.

SUMMARY OF THE INVENTION

Gas turbine drive apparatus provided with a housing, input drive means positioned within the housing and adapted for connection to a gas turbine, output drive means positioned within the housing and adapted for connection to a load, fluid coupling means interconnecting the input and output drive means, and means for supplying the coupling means with metered fluid to vary the speed of the output drive means.

The present invention increases the potential use of gas turbine engines to other than being able solely to drive generators. Their capability is increased to the extent of being able to power a load of high-starting inertia. Provision is made for isolating the load to allow the turbine to reach operating speed before accepting the load, thus attaining the same capability of a free-power turbine or split-shaft turbine at much lower cost. Another important advantage is that the drive apparatus of the present invention provides for high damping of shock loads.

Mounting the fluid coupling on the relatively high speed intermediate shaft of the drive system which typically rotates at 1/7 of the turbine speed, allows the use of a small compact size fluid coupling. Also, the output shaft speed of the drive apparatus can easily be changed by changing the last reduction gear without requiring change of the fluid coupling, as would be the case in drives equipped with fluid couplings on the output shaft.

DETAILED DESCRIPTION OF THE PREFERRED EMBODIMENTS

Figure 1:
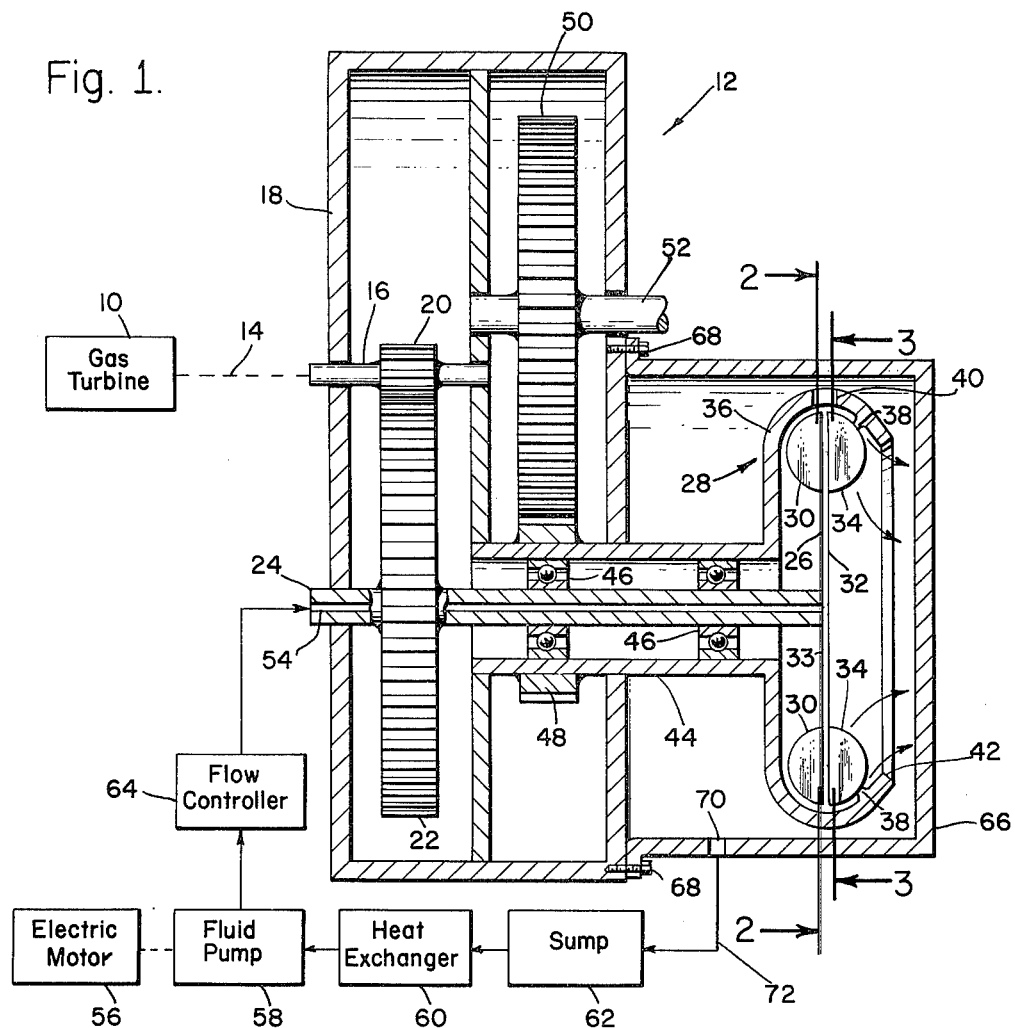
FIG. 1 is a schematic view, partly in section, showing an engine connected to drive apparatus embodying the present invention.
Figure 2:
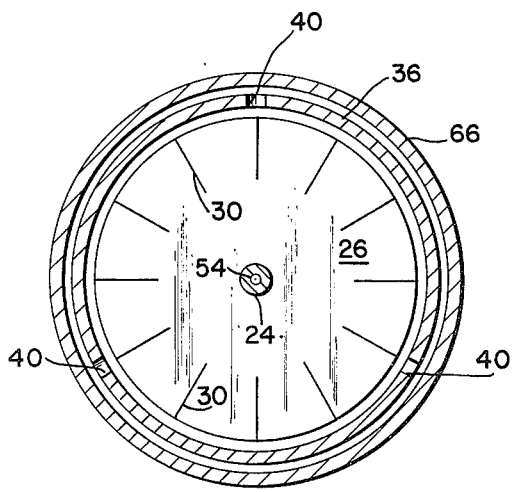
FIG. 2 is a transverse section taken on the line 2—2 of FIG. 1.
Figure 3:
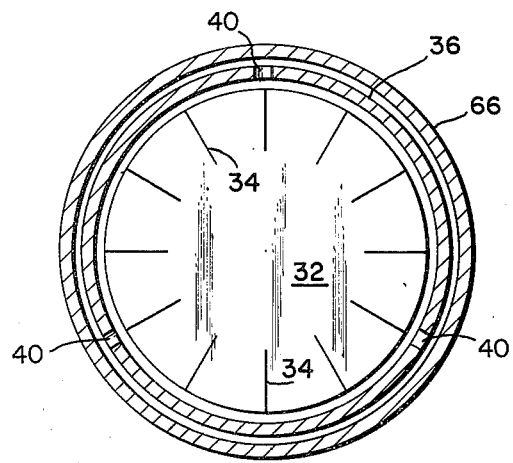
FIG. 3 is a transverse section taken on the line 3—3 of FIG. 1.

Reference is now made to FIGS. 1–3 of the drawings wherein there is shown an engine 10 connected to the drive system 12 embodying the present invention. Engine 10 is of the "single-shaft" gas turbine type and has its output shaft 14 connected to an input shaft 16 suitably mounted for rotation in housing 18 of drive system 12.

Drive system 12 additionally consists of an input gear 20 secured to input shaft 16. Input gear 20 is shown in meshing engagement with a driven intermediate gear 22. Gear 22 is secured to an intermediate shaft 24 having one end mounted for rotation in housing 18, and the other end secured to an inner rotor member or impeller 26 of a fluid coupling device 28. Impeller 26 carries a plurality of vanes 30. An annular housing member or runner 32 is spaced axially outwardly of impeller 26 by center space 33, and also carries a plurality of vanes 34.

An annular outer member 36 is spaced radially outwardly of both impeller 26 and runner 32, and is secured as by members 38 to vanes 34. A plurality of radial oil spill holes 40 are provided in the periphery of member 36. A radial opening or eye 42 in member 36 also serves as an oil spill. Outer member 36 has a cylindrical, tubular portion 44 suitably mounted for rotation in housing 18 concentric with the elongated portion of shaft 24. Suitable bearing arrangements 46 are provided intermediate shaft 24 and tubular member 44. A gear 48 is secured to member 44 and is shown as meshing with a driven output gear 50 which is secured for rotation on an output shaft 52 suitably mounted in housing 18.

A central bore 54, in shaft 24, and connected with space 33, serves to convey coupling fluid, such as oil, to fluid coupling 28.

Fluid drive oil is provided central bore 54 by means of an electric motor 56 driving a fluid pump 58 which receives oil through a heat exchanger 60 from a sump 62. Although pump 58 has been illustrated as being driven by motor 56, it will be appreciated that it could be driven by a suitably connected gear and shaft arrangement provided in housing 18. A controller 64, such as a flow metering valve, suitably connected to bore 54, regulates flow of oil from pump 58 to fluid coupling 28. Heat exchanger 60 can be of the water cooled type.

A cylindrical casing 66, which covers fluid coupling 28, is secured, as by bolts 68, and serves to collect oil discharged from spill holes 40 and eye 42. An orifice 70 in the lower side of casing 66 serves to discharge accumulated oil from the casing. A conduit 72, suitably attached to the bottom of casing 66 is utilized to convey oil discharged by orifice 70 back to oil sump 62.

In operation, gas turbine 10 is first run up to operating speed to turn shaft 16, gear 20, gear 22, shaft 24, and impeller 26. Oil flow is then initiated to the center space 33 of fluid coupling 28 through bore 54 by activating motor 56 and fluid pump 58. As oil flows to coupling 28, into space 33, and between vanes 30 and 34, runner 32 begins to rotate along with impeller 26 due to the coupling action of the oil. As runner 32 rotates so does annular portion 36, tubular portion 44, gear 48, gear 50 and output shaft 52. Oil flow is gradually increased to, say, 6.0 gal./min. in a typical installation when there is a 500 hp load absorption, by regulating flow controller 64. However, it will be appreciated that the rate of increase of oil flow can be adjusted by controller 64 to suit the particular starting load conditions encountered. Oil flows from coupling 28 through spill holes 40, at say, 3.0 gal./min., and the remainder through eye 42 of runner member 36. When turbine 10 is stopped, and drive apparatus 12 comes to a halt, any remaining oil in coupling 28 drains through spill holes 40 into casing 66 so as to provide an uncoupled start for turbine 10 the next time it is activated. By maintaining such a high flow of oil during operation, heat developed due to the small percentage slippage encountered at full load is carried off. A high content of air is also entrained in the oil during operation due to the aerating action of the fluid coupling 28. To preclude problems arising from this condition, such as pump cavitation, the oil from casing 66 is conveyed to sump 62, which is of large enough capacity to provide the oil with sufficient air cleaning dwell time, before it is again passed through heat exchanger 60 for cooling by pump 58 and motor 56 to coupling 28.

While a specific embodiment of the invention has been illustrated and described, it is to be understood that it is provided by way of example only and that the invention is not to be construed as being limited thereto, but only by the proper scope of the following claims.

What I claim is:

1. Gas turbine engine drive apparatus comprising:
    a single shaft gas turbine engine having an output shaft;
    an input drive shaft connected to said output shaft of said gas turbine engine;
    an output drive shaft adapted for connection to a load;
    intermediate shaft means including a first rotary shaft having a first and a second end and a second rotary shaft having a first end and a second end, said first end of said first shaft being adjacent said first end of said second shaft, and said second end of said first shaft being adjacent said second end of said second shaft;
    bearing means between said first shaft and said second shaft for concentrically supporting said second shaft with respect to said first shaft;
    first speed reduction gear means between said input drive shaft and said first end of said first rotary shaft for driving said first shaft at a slower speed than said input shaft;
    second speed reduction gear means between said first end of said second rotary shaft and said output drive shaft for driving said output shaft at a slower speed than said second shaft;
    said intermediate shaft means also including fluid coupling means interconnecting said second end of said first shaft and said second end of said second shaft; and
    means for supplying said fluid coupling means with metered fluid to vary the torque transmitted to said output drive shaft.

2. The apparatus of claim 1 wherein said fluid coupling means includes an impeller member secured on said second end of said first shaft and a housing member secured on said second end of said second shaft, said housing member having internal vanes to function as a runner in response to rotation of said impeller member when fluid is conducted into said housing member by said fluid supplying means.

3. The apparatus of claim 2 wherein said housing member includes first and second fluid outlet means and wherein said fluid supplying means comprises:
    a casing surrounding said housing member to collect fluid flowing from said first and second outlet means;
    sump means for collecting fluid from said casing;
    pump means for directing fluid from said sump;
    valve means connected to said pump means for metering flow of the fluid; and
    fluid passage means for conveying the metered fluid from said valve means to said fluid coupling means.

4. Gas turbine engine drive apparatus comprising:
    a single shaft gas turbine engine having a turbine shaft;
    a housing;
    an input shaft mounted for rotation in said housing and directly connected to said turbine shaft of said gas turbine engine, said input shaft carrying a gear;
    an intermediate shaft having a first end and a second end, being mounted for rotation in said housing and carrying a gear at said first end meshing with said input shaft gear, said gears having a ratio to effect rotation of said intermediate shaft at a slower speed than said input shaft;
    a power shaft mounted for rotation within said housing and adapted for connection to a load, said power shaft carrying an output shaft gear;
    a runner member mounted for rotation within said housing, having a tubular portion with a first end adjacent said first end of said intermediate shaft and with a second end connected to another portion having internal vanes, said first end of said tubular portion carrying a gear meshing with said output shaft gear, said gears having a ratio to effect rotation of said output shaft at a slower speed than said runner member;
    bearing means between said intermediate shaft and said tubular portion for concentrically supporting said tubular portion and said intermediate shaft;
    an impeller member connected to said second end of said intermediate shaft for rotation therewith, said impeller member being positioned within said runner member and having vanes cooperable with said runner member vanes for relative rotation with said runner member;
    means for selectively supplying fluid to said impeller member and said runner member for varying the degree of fluid coupling between said impeller member and said outer member.

5. The apparatus of claim 4 wherein said means for supplying includes a bore longitudinally disposed within said intermediate shaft.

* * * * *